United States Patent
Bealkowski

(10) Patent No.: US 8,010,634 B2
(45) Date of Patent: Aug. 30, 2011

(54) SELECTION AND CONFIGURATION OF STORAGE-AREA NETWORK STORAGE DEVICE AND COMPUTING DEVICE, INCLUDING CONFIGURING DHCP SETTINGS

(75) Inventor: Richard Bealkowski, Redmond, WA (US)

(73) Assignee: International Business Machines Corporation, Armonk, NY (US)

( * ) Notice: Subject to any disclaimer, the term of this patent is extended or adjusted under 35 U.S.C. 154(b) by 813 days.

(21) Appl. No.: 11/549,649

(22) Filed: Oct. 15, 2006

(65) Prior Publication Data

US 2008/0028045 A1 Jan. 31, 2008

Related U.S. Application Data

(63) Continuation-in-part of application No. 11/460,213, filed on Jul. 26, 2006.

(51) Int. Cl.
*G06F 15/177* (2006.01)
(52) U.S. Cl. .......................... 709/220; 709/221; 709/222
(58) Field of Classification Search .................. 709/220
See application file for complete search history.

(56) References Cited

U.S. PATENT DOCUMENTS

| | | | | |
|---|---|---|---|---|
| 6,073,178 A * | 6/2000 | Wong et al. | .................. | 709/229 |
| 6,920,494 B2 * | 7/2005 | Heitman et al. | .............. | 709/223 |
| 2002/0188709 A1 * | 12/2002 | McGraw et al. | .............. | 709/223 |
| 2002/0188718 A1 * | 12/2002 | McGraw et al. | .............. | 709/224 |
| 2003/0182422 A1 * | 9/2003 | Bradshaw et al. | ............ | 709/225 |
| 2003/0226004 A1 | 12/2003 | Abbondanzio et al. | | |
| 2004/0080527 A1 * | 4/2004 | Elliott | ........................... | 345/734 |
| 2004/0081104 A1 | 4/2004 | Pan et al. | | |
| 2005/0021654 A1 * | 1/2005 | Kern et al. | .................... | 709/211 |
| 2005/0060413 A1 * | 3/2005 | Oyadomari et al. | .......... | 709/227 |
| 2005/0071482 A1 * | 3/2005 | Gopisetty et al. | ............. | 709/229 |
| 2005/0216788 A1 * | 9/2005 | Mani-Meitav et al. | .......... | 714/6 |

(Continued)

FOREIGN PATENT DOCUMENTS

CN 1797343 A1 11/2005

OTHER PUBLICATIONS

Chinese office action in corresponding Chinese patent application, 200710139108.9, citing Chinese patent document 1797343A, which has US corresponding patent application 2006/0136704, office action is dated Mar. 29, 2010.

*Primary Examiner* — Firmin Backer
*Assistant Examiner* — Jonathan Bui
(74) *Attorney, Agent, or Firm* — Thomas Tyson

(57) ABSTRACT

A chassis is selected from one or more chassis. Each chassis has one or more computing devices installed therein. A computing device is selected from the computing devices installed in the selected chassis. Each computing device is connected to one or more switches within the chassis. A switch is selected from the switches to which the selected computing device is connected. Each switch is connected to a storage-area network (SAN) encompassing one or more SAN storage devices. A SAN storage device is selected from the SAN storage devices connected to the selected switch. Network settings for the SAN storage device and/or the computing device are configured, including dynamic host configuration protocol (DHCP) settings for the computing device. The SAN storage device is configured for use by the computing device. An operating system (OS) instance is selected and deployed onto the SAN storage device for use by the computing device.

19 Claims, 13 Drawing Sheets

U.S. PATENT DOCUMENTS

| | | |
|---|---|---|
| 2005/0283549 A1 | 12/2005 | Gibson et al. |
| 2006/0004918 A1* | 1/2006 | Lubeck et al. ............... 709/223 |
| 2006/0031448 A1 | 2/2006 | Chu et al. |
| 2006/0136704 A1 | 6/2006 | Arendt et al. |
| 2006/0155749 A1* | 7/2006 | Shankar et al. ............. 707/102 |
| 2006/0178864 A1* | 8/2006 | Khanijo et al. ................ 703/20 |
| 2006/0230103 A1* | 10/2006 | Takamoto et al. ........... 709/203 |
| 2006/0236061 A1* | 10/2006 | Koclanes ..................... 711/170 |
| 2007/0043829 A1* | 2/2007 | Dua ............................. 709/219 |
| 2007/0067589 A1* | 3/2007 | Mishra et al. ................ 711/163 |
| 2007/0070975 A1* | 3/2007 | Otani et al. ................... 370/351 |
| 2007/0079097 A1* | 4/2007 | Karnowski et al. .......... 711/170 |
| 2007/0180485 A1* | 8/2007 | Dua ............................. 725/114 |
| 2007/0192604 A1* | 8/2007 | Chiasson et al. ............. 713/170 |
| 2007/0220310 A1* | 9/2007 | Sharma et al. .................. 714/6 |
| 2007/0223681 A1* | 9/2007 | Walden et al. ........... 379/221.09 |
| 2008/0320136 A1* | 12/2008 | Holt et al. .................... 709/224 |

* cited by examiner

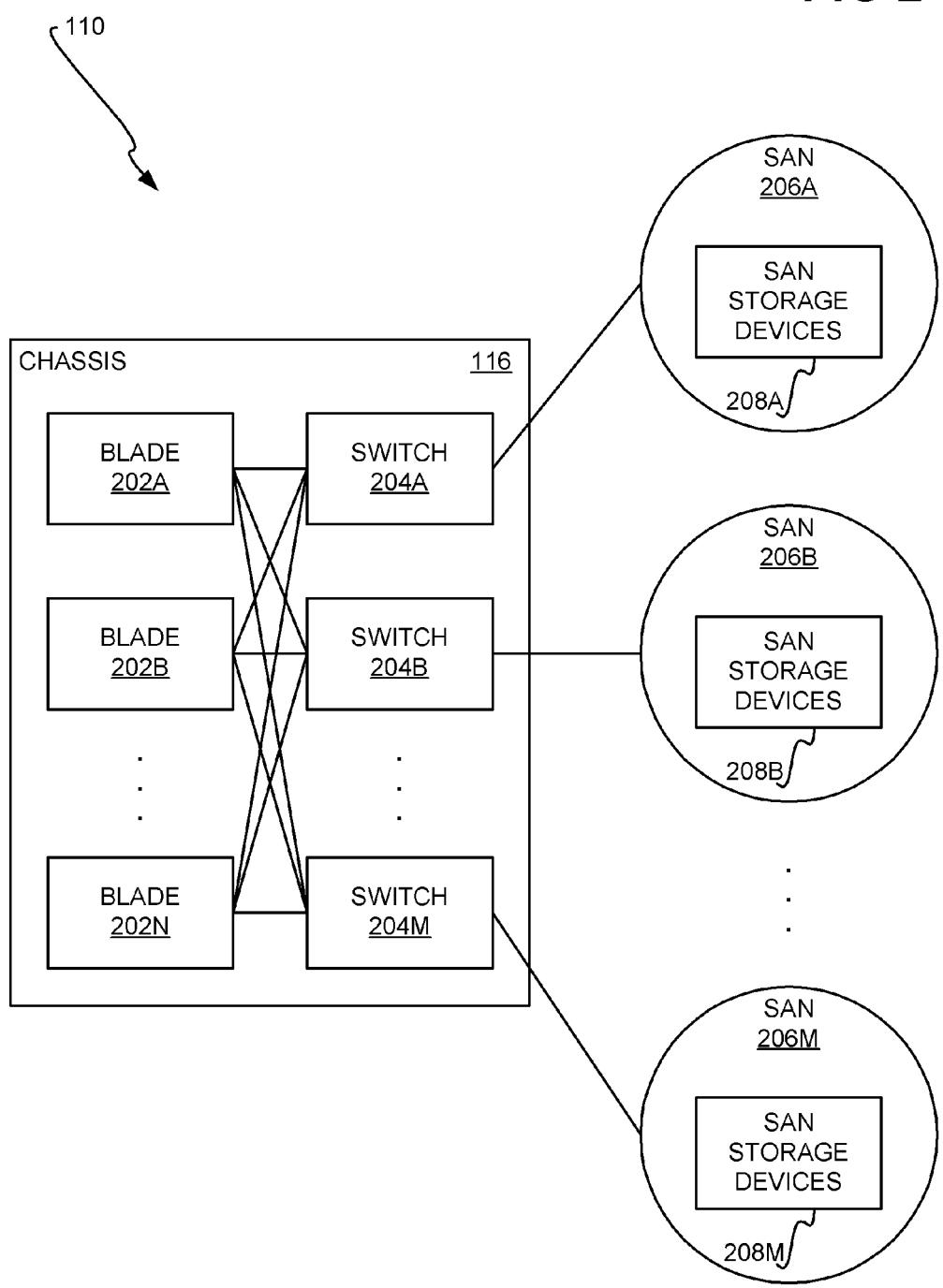

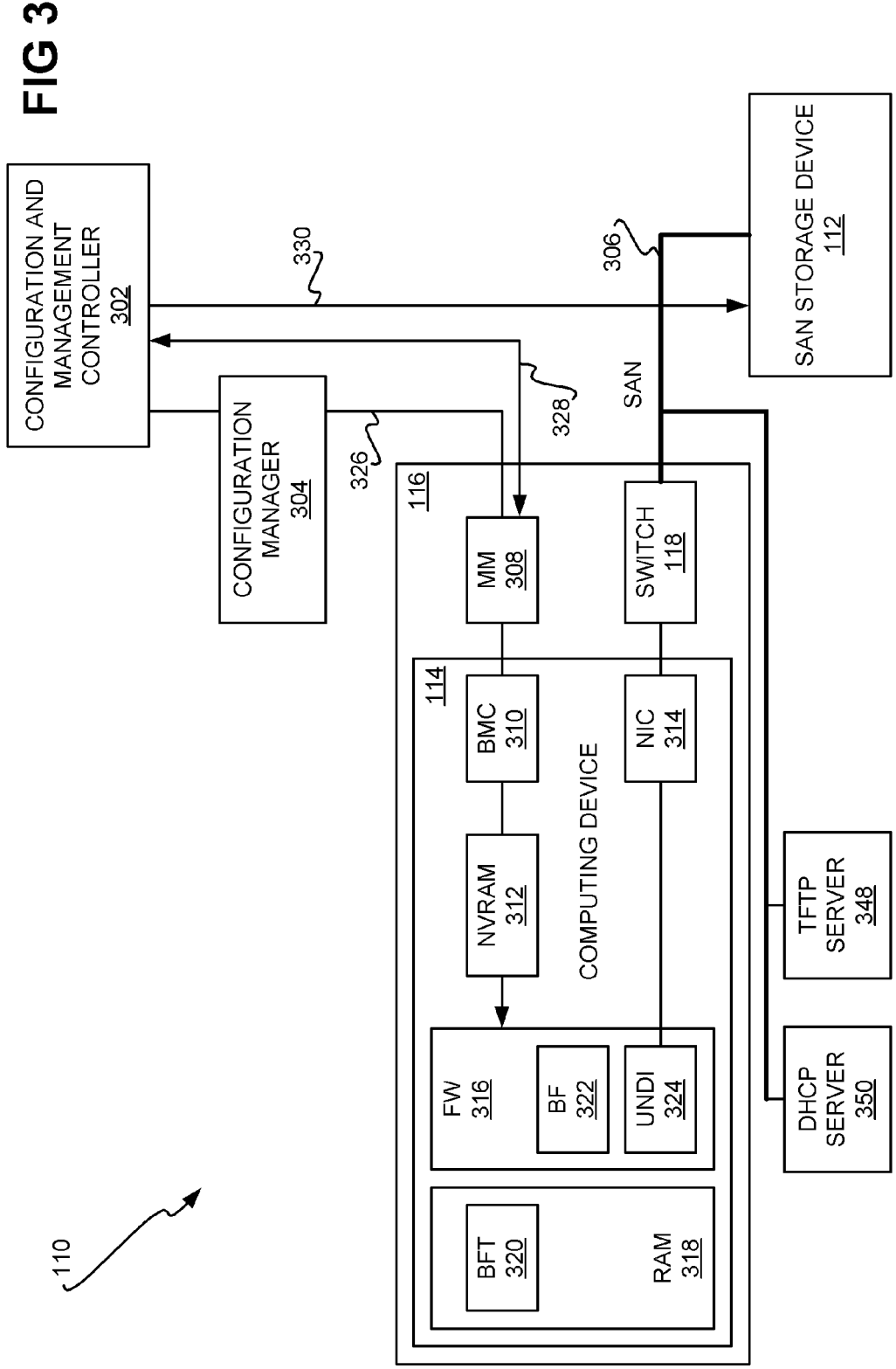

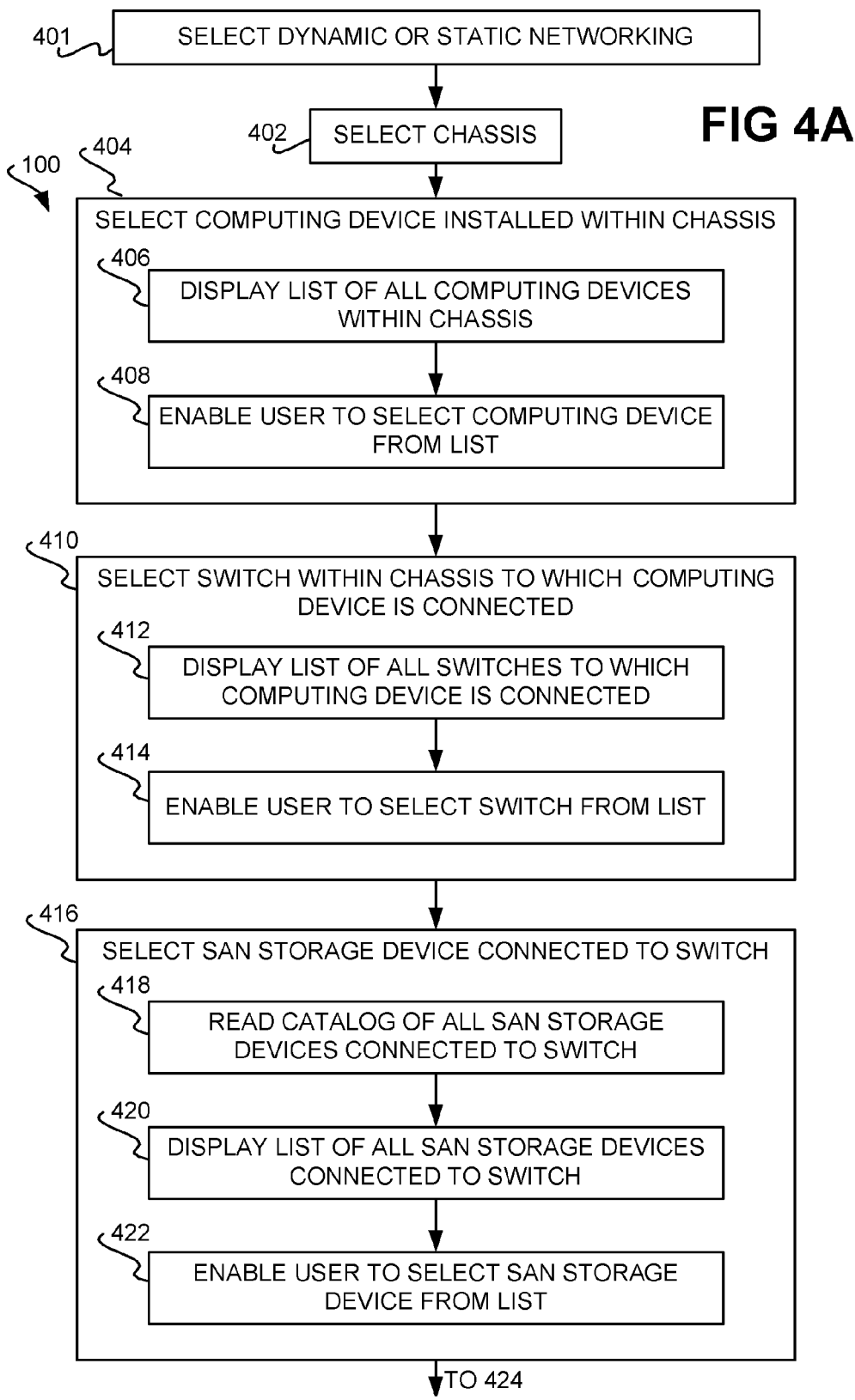

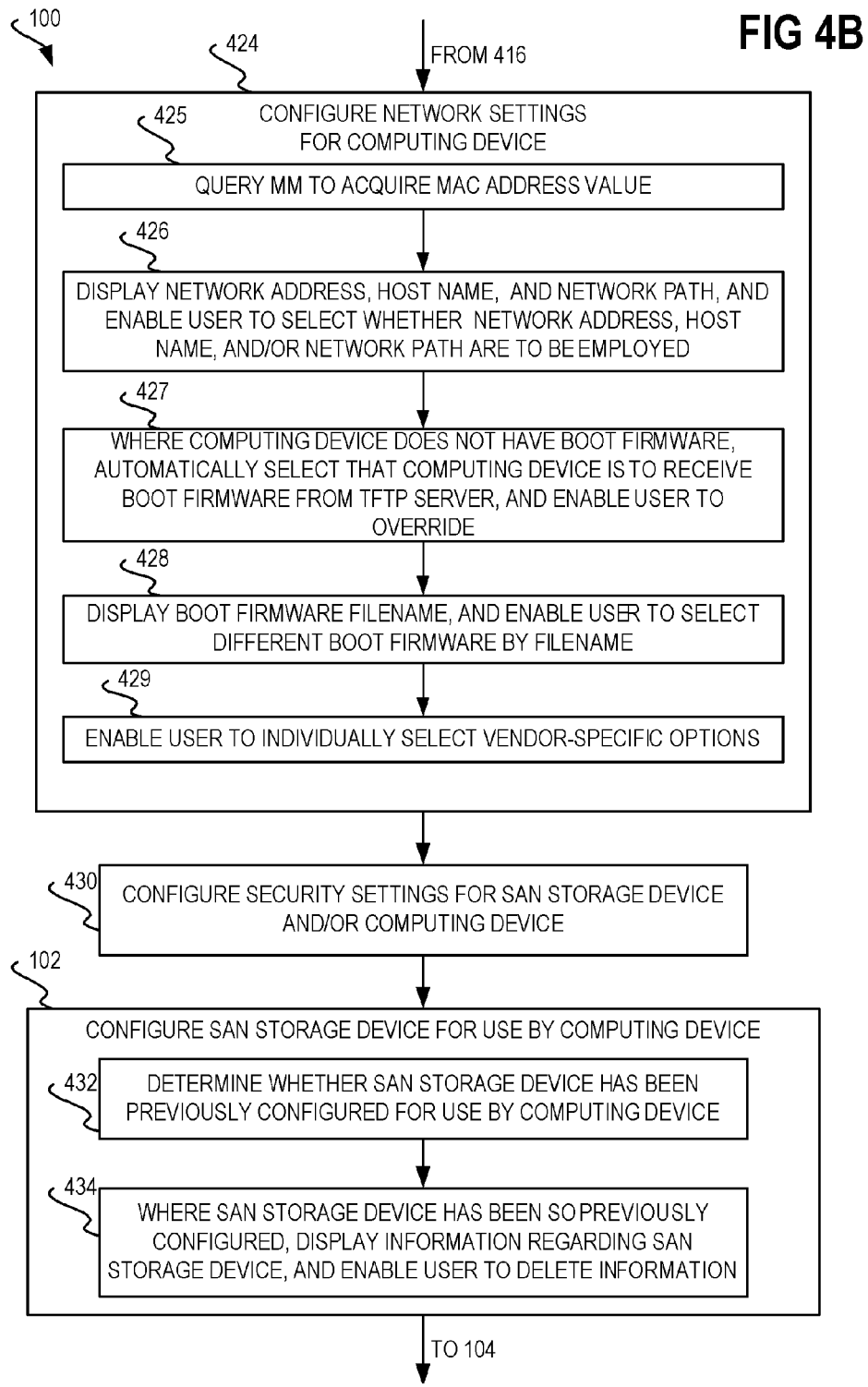

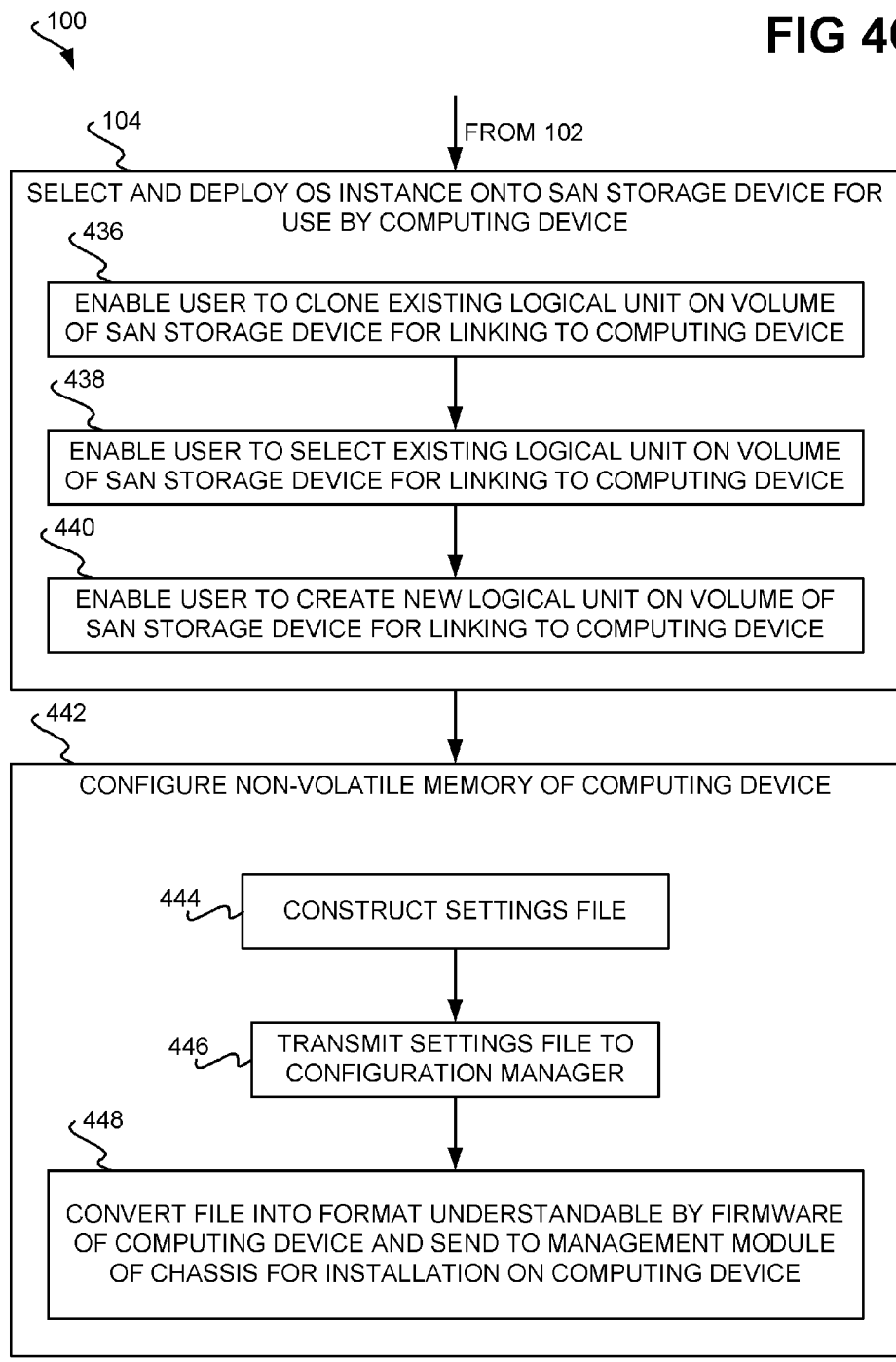

BladeCenter Information 506  510

| | | |
|---|---|---|
| IP Address | 9.39.76.73 | Get IP From Network Name |
| Network Name | MyMM.domain.com | Get Network Name From IP |
| User ID | MyUserID | 518   512 |
| Password | ******** | 520 |
| Slots | 14 | 514 |
| MM Name | MgmtModName | 516 |

508

If you make changes you must click Replace or Add New.  522

| Add New | Replace | Delete ! | Defaults | Clear | Next> |

526  Click on a Row to Select the Blade

| Index | Type | Slot | Name | Model | Serial Number | MAC 1 | MAC |
|---|---|---|---|---|---|---|---|
| 01 | PB | 1 | Mail Admin | 884345UK... | SNR1010 | 00:14:5e:3d:93:1a | 00:14:5e:3d |
| 02 | PB | 2 | Mail Srv 1 | 884345UK... | SNR1020 | 00:14:5e:3d:95:04 | 00:14:5e:3d |
| 03 | PB | 3 | Mail Srv 2 | 8843E2UK... | SNR1030 | 00:14:5e:3d:20:52 | 00:14:5e:3d |
| 04 | PB | 4 | Domain Control | 8832G1XK... | SNT1040 | 00:0d:60:4e:3b:56 | 00:0d:60:4e |
| 05 | *** | | | | | | |
| 06 | *** | | | | | | |
| 07 | PB | 7 | Server001 | 867821Z2... | SNR1050 | 00:09:6b:00:02:87 | |
| 08 | PB | 8 | Server002 | 867831X2... | SNR1060 | 00:09:6b:00:13:a1 | 00:09:6b:00 |
| 09 | PB | 9 | Server003 | 867841X2... | SNR1070 | 00:09:6b:00:15:63 | |
| 10 | PB | 10 | Backup System 1 | 8853DWZ... | SNR1080 | 00:14:5e:1d:22:44 | 00:14:5e:1d |
| 11 | PB-2 | 10 | | | | | |
| 12 | PB | 12 | Server005 | 884341Z2... | SNR1090 | 00:0d:60:5b:91:f8 | 00:0d:60:5b |
| 13 | PB | 13 | File Server 1 | 8843E2UK... | SNR2010 | 00:14:5e:3d:1e:fe | 00:14:5e:3d |
| 14 | PB | 14 | Server010 | 798131Z2... | SNR2020 | 00:14:5e:2e:01:dc | 00:14:5e:2e |

528 Next>

Motherboard NICs usually 1 and 2, Daughter Card NICs usually 3 and 4

Switch 1 ● NIC 1          00:0d:60:5b:91:f8
Switch 2 ○ NIC 2          00:0d:60:5b:91:f9
Switch 3 ○ Empty NIC Slot 00:00:00:00:00:00
Switch 4 ○ Empty NIC Slot 00:00:00:00:00:00

↑
534               532        536  [Next>]

Target Information
  Target IP   [192.168.70.200]    [192.168.70.200 ▼]
  User ID     [root]
540 {  Password   [********]
  Target IQN  [iqn.1993-02.com.company:abc123]
  Port        [3260]

Storage Device Information
542 {  Version  [Version a.b.c]
  Model [Model-x]  Type [Type-y]  Vendor [Vendor-z]

[Add Target] [Chng Target] [Del Target]   [Validate Target] [Next>]
                                               546    544
        548

- Initiator Parameters
  - Name (IQN) | iqn.2005-03.com.ibm:SNR1090

- Basic DHCP Options
  - IP Address | 192.168.70.50
  - ☑ Option 12 host-name | SYSTEMNAME
  - ☑ Option 17 root-path | iscsi.192.168.70.200:6:3260:0:iqn.1993-02.com.company:abc123

551

- DHCP NBP Options
  - ☐ Option 66 next-server | 192.168.70.47
  - ☐ Option 67 filename | NBPs\iscsinbp.bin | View NBP List ▼

552

- DHCP Vendor Options
  - ☐ Option 201 Target 1 | iscsi.192.168.70.200:6:3260:0:iqn.1993-02.com.company:abc123
  - ☐ Option 202 Target 2 |
  - ☐ Option 203 Initiator | iqn.2005-03.com.ibm:SNR1090

553

562 [ Next> ]

FIG 5G

556 iSCSI Information iSCSI Initiator    iqn.2005-03.com.ibm:26k9392 iSCSI Target     iqn.1993-02.com.storagevendor:sn.abc123

CHAP Selection

User Name    [                    ]
Secret  [96] [                    ]  } 558

☐ Enable Reverse CHAP Authentication

User Name    [                    ]
Secret  [96] [                    ]  } 560

562  [Next>]

Information

Volume Select [ vol1 ▼ ]

566 {
Volume [ vol1 ]
Initiator [ iqn.2005-03.com.ibm:26k9392 ]
Initiator Group [ 26k9392 ]
Lun [ /vol/vol1/26k9392 ]
}

[ Check ] 568

570 {
Actions
☐ Delete Lun [ /vol/vol1/26k9392 ]
☐ Delete iGroup [ 26k9392 ]
}

572 [ Next> ]

⦿ Link Clone [ Select ] [ /vol/vol1/Windows2003Standard MasterImage ]
○ Link to Lun [ Select ] [ ]
○ New LUN (Fresh Install)
  Lun Size [ 5000 ] MB
  ☐ Partition
  Partition Size [ 5000 ] MB
  ☐ Format NTFS
○ Skip LUN Selection

576 ↑

578 [ Next> ]

FIG 5J

```
580
┌─────────────────────────────────────────────┐
│ Information                                 │
│     Blade Slot    12                        │
│     Blade Model   8843          } 582       │
│     CHAP          None                      │
│     Parameters    DHCP Vendor Options       │
│ NVRAM Selection                    584      │
│     Port/Switch   [0          ]             │
│     Do you want to download NVRAM settings? │
│     ⦿ Yes                                   │
│     ○ No                          588 ┌─────┐│
│     586                               │Next>││
│                                       └─────┘│
└─────────────────────────────────────────────┘
```

FIG 5K

```
590
┌─────────────────────────────────────────────┐
│                                    592      │
│  Blade Number:  [12          ]              │
│                                             │
│  Each Checked Item Will Be Done In Order    │
│     ☐ Power Off                             │
│     ☑ Power On                    } 594     │
│     ☑ Assign KVM                            │
│     ☐ Assign Media Tray                     │
│                                             │
│                                   596 ┌─────┐│
│                                       │Next>││
│                                       └─────┘│
└─────────────────────────────────────────────┘
```

SELECTION AND CONFIGURATION OF STORAGE-AREA NETWORK STORAGE DEVICE AND COMPUTING DEVICE, INCLUDING CONFIGURING DHCP SETTINGS

RELATED PATENT APPLICATIONS

The present patent application is a continuation-in-part of the previously filed patent application entitled "Selection and configuration of storage-area network storage device and computing device," filed on Jul. 26, 2006, and assigned Ser. No. 11/460,213.

FIELD OF THE INVENTION

The present invention relates generally to storage-area network (SAN) storage devices, and more particularly to configuring such SAN storage devices so that they can be used in relation to computing devices, such as blade computing devices.

BACKGROUND OF THE INVENTION

In large organizations, the management of computing devices is an important task. To make such management more convenient to information technology (IT) personnel, and thus less costly, one relatively new paradigm is the "blade" computing device. A given chassis has inserted thereinto a number of blade computing devices. Each blade computing device may then be assigned to an individual end user remotely located from the blade computing device, or a number of users may have their own virtualized computing devices shared on the same one or more blade computing devices.

Due to their size, however, blade computing devices typically have no internal storage devices or a very limited number or size of internal storage devices, such as hard disk drives. Rather, they are commonly assigned at least a portion of a storage device that is communicatively connected to all the blade computing devices. One relatively common approach is to have a storage-area network (SAN) that includes a number of SAN storage devices. A logical disk may be defined on one or more of these SAN storage devices for utilization by a given blade computing device. For example, such a logical disk may store the operating system (OS) instance that controls the blade computing device.

In such computing device topologies, where there are a relatively large number of computing devices and a relatively large number of SAN storage devices, configuration of one particular computing device to use a logical disk defined on one or more of the SAN storage devices can be complicated. A large number of settings and parameters may have to be configured properly for a given computing device to be able to use a given SAN storage device. If any of these settings or parameters is not configured properly, the computing device may not be able to function in relation to the SAN storage device. For this and other reasons, there is a need for the present invention.

SUMMARY OF THE INVENTION

The present invention relates to selection and configuration of a storage-area network (SAN) storage device and a related computing device. A method of one embodiment of the invention includes selecting a chassis from one or more chassis. Each chassis has one or more computing devices installed therein. A computing device is selected from the computing devices installed in the selected chassis. Each computing device is connected to one or more switches within the chassis. A switch is selected from the switches to which the selected computing device is connected. Each switch is connected to a storage-area network (SAN) encompassing one or more SAN storage devices. A SAN storage device is selected from the SAN storage devices connected via a SAN to the selected switch. Network settings for the selected SAN storage device and/or the selected computing device are configured. Particularly, dynamic host protocol configuration (DHCP) settings for the selected computing device are configured. The selected SAN storage device is configured for use by the selected computing device. An operating system (OS) instance is selected and deployed onto the selected SAN storage device for use by the selected computing device.

A system of an embodiment of the invention includes a chassis, one or more computing devices installed within the chassis, and one or more switches installed within the chassis and connected to each computing device. The system further includes one or more SAN devices connected via a SAN to each switch, and a configuration and management controller. The controller enables a user to select a desired computing device from the computing devices installed within the chassis, to select a desired switch from the switches installed within the chassis, and to select a desired SAN storage device from the SAN storage devices connected to the desired switch. The controller also enables the user to configure DHCP settings for the selected computing device. The controller further enables the user to configure the desired SAN storage device for use by the desired computing device, and to select and deploy an OS instance onto the desired SAN storage device for use by the desired computing device.

An article of manufacture of an embodiment of the invention includes a tangible computer-readable medium, and means in the medium. The computer-readable medium may be a recordable data storage medium, or another type of tangible computer-readable medium. The means is for selecting a desired blade computing device installed within a chassis, for selecting a desired switch installed within the chassis, and for selecting a desired SAN storage device connected via a SAN to the desired switch. The means is also for configuring DHCP settings for the selected computing device. The means is further for configuring the desired SAN storage device for use by the desired blade computing device, and for selecting and deploying an OS instance onto the desired SAN storage device for use by the desired blade computing device.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 2 is a diagram of a system having a chassis in which a number of blade computing devices are installed, and having a number of storage-area networks (SAN's), according to an embodiment of the invention.

FIG. 3 is a diagram of a portion of the system of FIG. 2 in further detail, according to an embodiment of the invention.

FIGS. 4A, 4B, and 4C are flowcharts of a method consistent with but more detailed than the method of FIG. 1A, according to an embodiment of the invention.

FIGS. 5A, 5B, 5C, 5D, 5E, 5F, 5G, 5H, 5I, 5J, and 5K are diagrams of graphical user interfaces (GUI's) by which various parts of the method of FIGS. 4A, 4B, and 4C can be performed, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figures 1A, 1B:
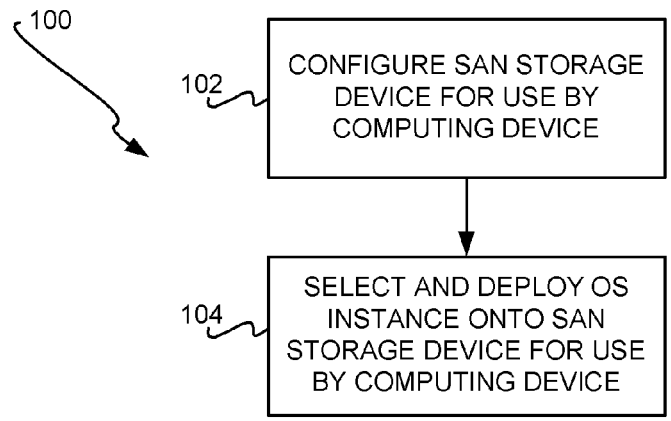
FIGS. 1A and 1B are a flowchart of a method and a diagram of a system in relation to which the method can be performed, respectively, according to a general embodiment of the invention, and are suggested for printing on the first page of the patent.

An overview of an embodiment of the invention is presented in relation to FIGS. 1A and 1B. FIG. 1A shows a method 100, according to an embodiment of the invention, and FIG. 1B shows a representative system 110 in relation to which the method 100 may be performed, according to an embodiment of the invention. A selected storage-area network (SAN) storage device 112 is configured for use by a selected computing device 114 (102). The selected SAN storage device 112 is one of a number of SAN storage devices on a SAN 122 of the system 110, which are not particularly shown in FIG. 1 for illustrative clarity and convenience. Likewise, the selected computing device 114 is one of a number of computing devices, such as blade computing devices, of the system 110, which are not particularly shown in FIG. 1 for illustrative clarity and convenience.

More specifically, the selected computing device 114 is one of a number of such computing devices installed within a chassis 116. The selected computing device 114 is connected to a switch 118 also installed within the chassis 116. The switch 118 is selected from a number of switches installed within the chassis 116, which are not particularly shown in FIG. 1 for illustrative clarity and convenience. The switch 118 communicatively connects the computing device 114 to the SAN storage device 112. Configuration of the SAN storage device 112 and the computing device 114 in part 102 of the method 100 can include configuring network settings, security settings, as well as other types of settings of either or both of the devices 112 and 114.

An operating system (OS) instance 120 is selected and deployed onto the SAN storage device 112 for use by the computing device 114 (104). The OS instance 120 is selected from a number of such OS instances, which are not particularly shown in FIG. 1 for illustrative clarity and convenience. The OS instance 120 is the OS that controls the functioning of the computing device 114. Thus, rather than the OS instance 120 being located at the computing device 114, it is located at the relatively remote SAN storage device 112. This allows the computing device 114 to be substantially managed independently of the SAN storage device 112, in one embodiment of the invention.

Embodiments of the invention are concerned with a programmatic manner by which each of a computing device and a SAN storage device is selected and configured for use with one another, including the selection and deployment of an OS instance on the SAN storage device for use by the computing device. Rather than a user having to manually configure the computing device and the SAN storage device, he or she is stepped through the selection process by a graphical user interface, such that configuration of the devices is automatically achieved. Embodiments by which such programmatic and substantially automatic selection and configuration of these devices can be achieved are now described.

Technical Background

FIG. 2 shows the representative system 110 of FIG. 1B in more detail, according to an embodiment of the invention. A single chassis 116 is depicted in FIG. 2. However, more generally, there may be a number of such chassis, where the chassis 116 is representative of all of these chassis within the system 110.

The chassis 116 includes a number of blade computing devices 202A, 202B, . . . , 202N, collectively referred to as the blade computing devices 202. A blade computing device is a component that is inserted into a blade computing system that itself is designed to accept a number of such blade computing devices. Blade computing devices can be individual server or client computing devices that plug into a single chassis. Thus, a blade computing system is a computing device architecture in which multiple computing devices are housed within a single chassis. In one embodiment, the blade computing devices 202 are diskless, or storage device-less, such that substantial non-volatile data storage is external to the devices 202 themselves.

The chassis 116 also includes a number of switches 204A, 204B, . . . , 204M, collectively referred to as the switches 204. The number of switches 204 may be less than the number of blade computing devices 202. The switches 204 are networking components that enable the blade computing devices to particularly access storage-area networks (SAN's), as will be described. Each of the computing devices 202 is connected to each of the switches 204 in one embodiment of the invention, as is particularly depicted in FIG. 2.

The switches 204 are connected to external storage-area networks (SAN's) 206A, 206B, . . . , 206M, collectively referred to as the SAN's 206. The number of SAN's 206 in one embodiment is equal to the number of switches 204. Each of the switches 204 is connected to one of the SAN's 206 in one embodiment as well. Each of the SAN's 206 includes one or more SAN storage devices, such as hard disk drives. Thus, the SAN's 206 include SAN storage devices 208A, 208B, . . . , 208M, collectively referred to as the SAN storage devices 208.

A SAN is a particular type of network of storage devices, such as hard disk drives. Thus, a SAN connects multiple computing devices to a centralized pool of hard disk drive storage. As compared to having to manage hundreds of computing devices, each with their own hard disk drives, SAN's allow improved manageability. The SAN's may be considered as a single resource, to ease disk maintenance and routine backups.

FIG. 3 shows a portion of the system 110 of FIGS. 1B and 2 in more detail, according to an embodiment of the invention. The system 110 is depicted in FIG. 3 as including the SAN storage device 112, the chassis 116 in which the computing device 114 and the switch 118 are physically installed or situated. As can be appreciated by those of ordinary skill within the art, each of the system 110, the chassis, 116, and the computing device 114 may include other components, in addition to and/or in lieu of those depicted in FIG. 3. For example, the chassis 116 can include a media tray and/or a keyboard-video-mouse (KVM) sharing device, both of which are not shown in FIG. 3 for illustrative convenience. Furthermore, the media tray can include devices such a floppy diskette drive, a DVD/CD drive, and/or one or more universal serial bus (USB) connectors. The media tray and/or KVM can be selectively coupled to the computing device 114.

The SAN storage device 112 is one of the storage devices 208 of FIG. 2. The computing device 114 is one of the blade computing devices 202 of FIG. 2. The switch 118 is one of the switches 204 of FIG. 2. The switch 118 communicatively connects the blade computing device 114 to the SAN storage device 112 via a SAN 306 encompassing the SAN storage device 112. Thus, the SAN 306 is one of the SAN's 206 of FIG. 2.

The system 110 is also depicted in FIG. 3 as including a configuration and management controller 302 and a configuration manager 304. The controller 302 and the manager 304 may be implemented in software, hardware, or a combination of software and hardware. Thus, the controller 302 and the manager 304 may be one or more computer programs running on a computing device other than the computing device 114 and the other of the blade computing devices 202, in one embodiment. Communication, management, configuration, and control of the SAN storage device 112, the chassis 116, and the computing device 114 are depicted in FIG. 3 via a number of lines 326, 328, and 330. The functionality performed as represented by each of these lines is described later in the detailed description. Thus, the functionality of the controller 302 and the manager 304 are described later in the detailed description.

The chassis 116 includes a management module (MM) 308. The management module 308 may be implemented in software, hardware, or a combination of software and hardware. The management module 308 particularly provides for configuration, control, and management of the blade computing devices installed within the chassis 116, such as the computing device 114. The management module 308 interacts directly with a baseboard manager controller (BMC) 310 of the computing device 114. The BMC 310 is hardware and/or software, and directly accesses non-volatile random access memory (NVRAM) 312 of the computing device 114.

The NVRAM 312 contains the settings by which firmware (FW) 316 of the computing device 114 functions. The firmware 316 may in one embodiment be the basic input/output system (BIOS) of the computing device 114. The firmware 316, based on the settings within the NVRAM 312, controls the booting up and the basic interaction between software and hardware on the computing device 114. That is, the firmware 316 may be considered the set of routines that provides an interface between the operating system and the hardware in the computing device 114. The firmware 316 supports all peripheral technologies. On startup, the firmware 316 tests the computing device 114 and prepares it for operation. Thereafter, the firmware 316 loads the operating system and passes control to the operating system.

The firmware 316 includes boot firmware (BF) 322, which specifically controls the booting of the operating system from an associated storage device, such as the SAN storage device 112. The firmware 316 further includes a universal network device interface (UNDI) 324, which enables the firmware 316 to communicate with the network interface controller (NIC) 314. The NIC 314 is a networking device, which enables the computing device 114 to access a network, such as via the switch 118 of the chassis 116.

In some embodiments of the invention, the network settings for the computing device 114 are not ultimately stored at the computing device 114 itself. That is, the computing device 114 itself does not store these network settings as configured. Rather, the network settings for the computing device 114 are stored at a dynamic host configuration protocol (DHCP) server 350. In such instance, during startup, the computing device 114 receives its network settings from the DHCP server 350. These network settings further include the identity of the SAN storage device 112 associated with the computing device 114.

In some embodiments of the invention, the computing device 114 does not store the BF 322 in non-volatile memory, such as read-only memory (ROM). In such instances, the computing device communicates with a Trivial File Transfer Protocol (TFTP) server 348 to obtain the BF 322, during what is known within the art as a preboot execution environment (PXE) sequence. When a transfer occurs in this fashion, the BF 322 may alternatively and generically be referred to as a network boot program (NBP). Thus, if the computing device 114 does not have the BF 322 stored thereat during startup, it retrieves the BF 322 from the TFTP server 348. The identity of the TFTP server 348 and the filename of the BF 322 are made known to the computing device 114 in one embodiment as part of the network settings acquired from the DHCP server 350.

The computing device 114 also includes volatile random-access memory (RAM) 318. The RAM 318 is the memory in which data is stored on a temporary basis, and to which computer programs are loaded for execution by the computing device 114, as can be appreciated by those of ordinary skill within the art. The RAM 318 stores a boot firmware table (BFT) 320, which is loaded into the RAM 318 by the boot firmware 322 at startup, and includes the settings that direct the computing device 114 to interact with the SAN storage device 112 as if the SAN storage device 112 were part of the computing device 114 itself.

Detailed Embodiment

FIGS. 4A, 4B, and 4C show the method 100 of FIG. 1A in a manner that is consistent with but more detailed than FIG. 1A, according to an embodiment of the invention. The method 100 is described in relation to representative performance within the system 100. However, the method 100 may be performed in relation to other types of systems, in addition to the system 100.

The user first selects whether network settings for the computing device that will be selected are to be configured dynamically, via dynamic host configuration protocol (DHCP), or statically, such that they are stored in non-volatile random-access memory (NVRAM) of this computing device (401). Configuring network settings statically is described in the previously filed patent application of which the present patent application is a continuation-in-part. Therefore, configuring network settings dynamically is specifically described herein, such that it is presumed that a user selects the option to dynamically configure the network settings for the computing device.

Figure 5A:
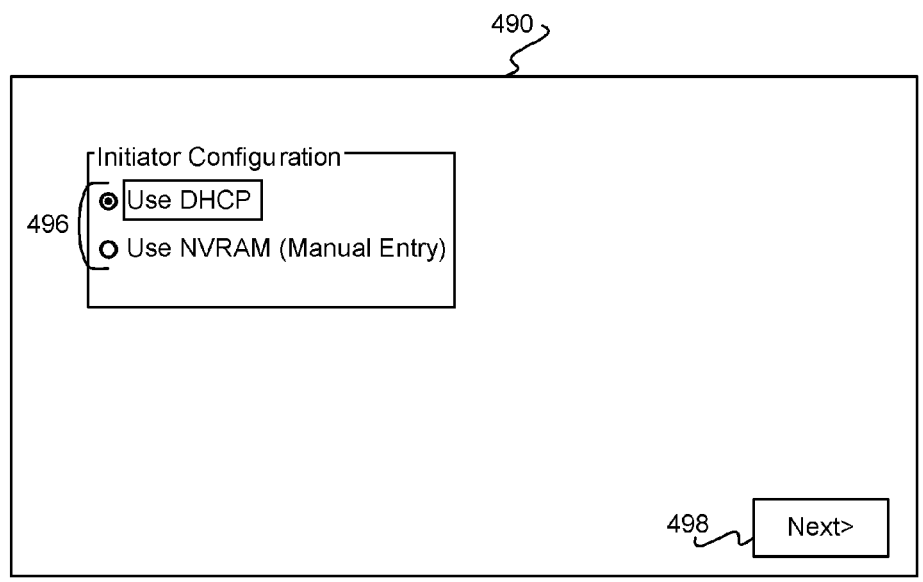

FIG. 5A shows a graphical user interface (GUI) 490, by which a user is able to select whether network settings are to be configured dynamically or statically, according to an embodiment of the invention. The GUI 490 enables a user to select, via the radio buttons 496, whether network settings are to be configured dynamically (i.e., "Use DHCP"), or manually (i.e., "Use NVRAM (Manual Entry)"). Once this selection has been made, the user presses the next button 498 to continue.

Referring back to FIG. 4A, the user then selects the chassis 116 from one or more chassis (402). The user may log onto the selected chassis 116 by providing a user identifier and a password that enables the user to have access to the chassis 116. This is indicated in FIG. 3 via the line 328. FIG. 5B shows a GUI 502, by which a user is able to select the chassis 116 from one or more chassis, according to an embodiment of the invention. A drop-down box 504 lists all the chassis available. In one embodiment, the configuration and management controller 302 retrieves a list of all the chassis available from a database in order to populate the drop-down box 504. This is achieved without any user intervention. For example, portions of the chassis database can be populated automatically by programmatically scanning the network for chassis using a service location protocol (SLP), as can be appreciated by those of ordinary skill within the art.

Once the user has selected a desired chassis, the IP address and/or the network name are displayed in the boxes 506 and 508. If either of these items is not displayed, the user can select the appropriate buttons 510 and 512 to refresh this information. Information regarding the desired chassis, as stored in the database or programmatically retrieved from management module 308, is displayed in the boxes 514 and 516, including the number of slots that the chassis has, corresponding to the maximum number of blade computing devices that can be installed within the chassis, as well as the name of the management module 308 of the chassis.

The user logs onto the chassis 116 by entering his or her user identifier and password into the boxes 518 and 520. Once the user is satisfied with the selection of the chassis 116, the button 522 is selected. Alternatively, the user can select one of the other buttons 524 to perform desired functionality as is conventional, as can be appreciated by those of ordinary skill within the art.

Referring back to FIG. 4A, the user then selects a computing device 114 installed within the chassis 116 (404). This is indicated in FIG. 3 via the line 328. In particular, the configuration and management controller 302 logs onto the management module 308 of the chassis 116, and retrieves information regarding all the computing devices installed within the chassis 116. Thereafter, a list of all the computing devices within the chassis 116 may be displayed to the user (406), from which the user is enabled to select a desired computing device (408).

FIG. 5C shows a GUI 525 by which a user is able to select the computing device 114 from all the computing devices installed within the selected chassis 116, according to an embodiment of the invention. A box 526 is presented in which all the computing devices installed within the selected chassis 116 are displayed, by row. For each computing device, various identifying characteristics of the computing device are presented. This information is obtained by the configuration and management controller 302 from the management module 308 of the chassis 116 itself. Once the user has selected the desired computing device 114, he or she selects the next button 528.

Referring back to FIG. 4A, the user selects a switch 118 within the chassis 116 to which the computing device 114 is connected (410). This is indicated in FIG. 3 via the line 328. In particular, the configuration and management controller 302 receives from the management module 308 of the chassis 116 the identities of all the switches installed within the chassis 116. A list of all the switches to which specifically the computing device 114 is connected may be displayed to the user (412), and the user enabled to select a desired switch 118 from the list (414).

FIG. 5D shows a GUI 530 by which a user is able to select the switch 118 from all the switches to which the computing device 114 is connected, according to an embodiment of the invention. A box 532 lists all the switches, including which NIC 314 of the selected computing device 114, if any, is connected to switch 118. The box 532 may further indicate the media access control (MAC) address of the associated NIC 314. In the example of FIG. 5D, just the first two switches are actually present. The user selects one of the radio buttons 534 to choose a desired switch 118, and then selects the next button 536. It is noted that each switch is connected to a different SAN, and thus by selecting the switch 118, the user is implicitly selecting the SAN 306.

Referring back to FIG. 4A, the user then selects a desired SAN storage device 112 from all the SAN storage devices connected to the SAN to which the desired switch 118 is connected (418). This is indicated in FIG. 3 via the line 330. In particular, the configuration and management controller 302 may read a catalog of all the SAN storage devices connected to the switch 118 (418), from a previously assembled database. Thereafter, the controller 302 displays this list to the user (420), who is enabled to select a desired SAN storage device 112 from the list (422).

FIG. 5E shows a GUI 536 by which a user is able to select the SAN storage device 112 from all the SAN storage devices connected to the SAN to which the switch 118 is connected, according to an embodiment of the invention. A drop-down box 538 lists the network addresses of all the SAN storage devices connected to the SAN to which the switch 118 is connected. By selecting a given network address, information regarding the SAN storage device having this network address is displayed in the boxes 540 and 542. The desired, selected SAN storage device 112 is also referred to as a target (where the previously selected computing device 114 is referred to as an initiator).

The user can change the information regarding the selected storage device 112 by modifying the information within the box 540 and pressing the appropriate button of the buttons 548. The add and delete buttons allow a user to add or delete an entry for a storage device within a database that stores the list of all the storage devices. The user can validate any of the information regarding the selected storage device 112 by pressing the validate button 546. Once the user is satisfied with his or her selection, the next button 544 is selected.

Referring to FIG. 4B, the user is able to configure the network settings for the selected computing device 114 (424). In the embodiment in which the network settings are configured dynamically via DHCP, this is achieved as follows. First, the MM 308 is programmatically queried for the media access control (MAC) address value of NIC 314 of computing device 114 (425). The MAC address of the computing device 114 is a globally unique address for network card or other network mechanism of the device 114, typically established by the manufacturer of the network card or other network mechanism, as can be appreciated by those of ordinary skill within the art. The DHCP settings for the computing device 114 will be associated with this MAC address.

The DHCP settings for the computing device 114 include at least a network address for the computing device 114, and a network path of the selected SAN storage device 112. The network address for the computing device 114 uniquely identifies the computing device 114 within the network on which the computing device 114 is located, and is typically an Internet Protocol (IP) address. The network path of the selected SAN storage device 112 specifies the root path of the SAN storage device 112, and may also include other information regarding the SAN storage device 112.

The network address for the selected computing device 114, the system or host name for the computing device 114, and the network path for the selected SAN storage device 112 are displayed, and the user is permitted to select whether the network address, host name, and the network path information provided are to be employed during network configuration of the computing device 114 (426). By default, for instance, the network address is determined by programmatically querying the DHCP server 350 and determining which network address is currently not in use and/or available to be used. A proposed available network address is displayed; however, the user has the option to override the proposed network address. Similarly, by default, the network path associated with the selected SAN storage device 112 is displayed. However, the user has the option to override this network path.

The DHCP settings for the computing device 114 may further include a network address of the TFTP server 348, as well as the filename of the boot firmware (BF) 322 as stored on the server 348. That is, where the selected computing device 114 does not store the BF 322 itself, this fact may be transmitted during querying of the DHCP server 350, or the DHCP server 350 may otherwise already know this fact. Therefore, the DHCP settings returned by the DHCP server 350 include the network address, such as an IP address, of the TFTP server 348, and the filename of the BF 322 stored on the server 348, so that the selected computing device 114 can properly boot when started, during preboot execution.

Where the selected computing device 114 does not have the BF 322 stored, then, the method 100 includes automatically selecting that the computing device 114 is to receive the BF 322 from the TFTP server 348, a selection that the user is permitted to override (427). The filename of the BF 322 is further displayed, but the user is permitted to select a different boot firmware, by filename, if desired (428). For instance, there may be more than one different boot firmware stored at the TFTP server 348, such that the user is permitted to select a different boot firmware than the one that is initially selected for the user.

Finally, the DHCP settings for the computing device 114 may include one or more vendor-specific options particular to the vendor of the computing device 114. When querying the DHCP server 350, the vendor of the computing device 114 may be transmitted, or the DHCP server 350 may otherwise already know this information. Therefore, if the DHCP server 350 has available vendor-specific options that are particular to the vendor of the computing device 114, these options are transmitted back to the computing device 114 as part of the DHCP settings. For example, these vendor-specific options may include additional and/or alternative network paths of the SAN storage device 112, an alternative name of the computing device 114, and/or other information. The user is thus permitted to individually select whether any of the vendor-specific options are to be employed during network configuration of the computing device 114 (429).

FIG. 5F shows a GUI 550 by which a user is able to configure the network settings of the computing device 114 in particular, according to an embodiment of the invention. The basic DHCP settings are displayed in the box 551, and include the network, or IP, address of the computing device 114, the system or host name of the device 114, and the network path of the SAN storage device 112. The user is permitted to individually select whether the latter two options are to be employed for network configuration of the computing device 114, via the associated checkboxes.

The DHCP NBP settings are displayed in the box 552, and include the network, or IP, address of the TFTP server 348, as well as the filename of the BF 322 stored at the TFTP server 348. If the user wishes to have the computing device 114 boot using either or both of these two settings, the appropriate checkbox or checkboxes are selected. Furthermore, if a different boot firmware is desired to be employed, a drop-down box can be accessed that lists all available boot firmware on the TFTP server 348. Finally, the box 553 displays the vendor-specific options, which the user can select by again selecting the appropriate checkbox or checkboxes.

Once the DHCP settings have been configured satisfactorily, the next button 554 is selected. Thereafter, the DHCP settings as modified by the user are sent to the DHCP server 350 for storage. Storage of the DHCP settings includes creating a DHCP reservation on the DHCP server 350. This reservation includes the MAC address of the NIC 314 and the network address specified within part 426 of the method 400. A set of DHCP options can be created as part of the reservation, including those values selected by the user, such as those selected within parts 426, 427, 428, and 429 of the method 400.

Referring back to FIG. 4B, in one embodiment the user is able to configure security settings for the SAN storage device 112, which is indicated in FIG. 3 via the line 330, and the computing device 114 (430). The user may be able to specify security that is initiated by the computing device 114, or security that is initiated by the SAN storage device 112. That is, authentication of the SAN storage device 112 may be initiated by the computing device 114, or authentication of the computing device 114 may be initiated by the SAN storage device 112. Alternatively still, the user may be able to specify security that is two-way, and initiated by both the computing device 114 and the SAN storage device 112.

FIG. 5G shows a GUI 556 by which a user is able to configure the security settings of the computing device 114 and the SAN storage device 112, according to an embodiment of the invention. The user in the area 558 is able to specify the enablement of challenge-handshake authentication protocol (CHAP) security initiated by the computing device 114 in relation to the SAN storage device 112. The user in the area 560 is able to specify the enablement of "reverse" CHAP security, initiated by the SAN storage device 112 in relation to the computing device 114, too. Once the user has selected the desired security settings, the next button 562 is selected.

Referring back to FIG. 4B, the SAN storage device 112 is then configured by the user for use by the computing device 114 (102). In one embodiment, the configuration and management controller 302 determines whether the SAN storage device 112 was previously configured for usage by the computing device 114 (432). If so, then information regarding this configuration is displayed, and the user is enabled to delete the information if desired (434). For instance, the relevant volume, or high-level partition, of the SAN storage device 112, the relevant logical unit ("LUN") of the volume, and the group associating this LUN to the computing device 114 may be displayed to the user. At this stage, the user thus has the opportunity to approve the existing configuration of the SAN storage device 112 in relation to the computing device 114. If the user chooses not to approve the existing configuration, by deleting it, then the user will be able to configure the SAN storage device 112 anew in the next stage, during the selection and deployment of an operating system (OS) instance stage, as will be described.

FIG. 5H shows a GUI 564 by which a user is able to approve an existing configuration of the SAN storage device 112 for use by the computing device 114, according to an embodiment of the invention. The drop-down box 564 lists all the high-level partitions, or volumes, of the selected SAN storage device 112. Upon selecting a given volume, the user selects the check button 568, which determines whether this volume of the SAN storage device 112 was previously configured for usage by the computing device 114. If so, then the relevant information is listed in the boxes 566, including the volume name, the initiator name (i.e., the name of the computing device 114), the group binding the computing device 114 to a LUN of the volume, and the name of the LUN itself.

If the latter three boxes are empty, then no LUN of the selected volume of the SAN storage device 112 was previously configured for usage by the computing device 114. As such, the user may select a different volume via the drop-down box 564, and repeat the process by selecting the check button 568, or may decide to use this volume, where a LUN does not exist on the volume as having been previously used by the computing device 114, and simply press the next button 572 to continue. If the user approves the existing LUN, where it is present, of the selected volume, the user can also select the next button 572 to continue.

However, if the user wishes to use the selected volume, but not the existing LUN on the selected volume of the SAN storage device 112, then the user may choose to delete either the LUN itself, or the group that associates the LUN with the computing device 114, via one of the two checkboxes 570, before pressing the next button 572. Deleting the LUN implicitly deletes the association of the LUN with the computing device 114. Deleting just the group that associates the LUN with the computing device 114 does not delete the LUN, however, and just deletes the association between the LUN and the computing device 114.

Referring to FIG. 4C, the user can select an OS instance to deploy onto the SAN storage device 112 for usage by the computing device 114 (104). The user in particular can perform one of three options. First, the user is enabled to clone an existing LUN of the previously selected volume of the SAN storage device 112 to link to the computing device 114 (436), where the existing LUN stores the desired OS instance. In this case, in effect a new LUN is created on the volume, and which is a clone of the existing LUN selected. Cloning is different than copying, in that the LUN clone appears instantaneous to the user, for instance.

Second, the user is enabled to select an existing LUN of the previously selected volume of the SAN storage device 112 to link to the computing device 114 (438), where this existing LUN stores the desired OS instance. In this case, the existing LUN is used. Third, the user is enabled to create an entirely new LUN of the previously selected volume of the SAN storage device 112 to link to the computing device 114 (440). The user in this latter option is able to determine which OS instance to store on the new LUN for the computing device 114, such that ultimately it is said that the new logical unit does indeed store this OS instance. Part 104 of the method 100 of FIG. 4C is depicted in FIG. 3 by the line 330.

FIG. 5I shows a GUI 574 by which a user is able to select a LUN or create a LUN on the storage device 112 for usage as a boot logical disk by the computing device 114, according to an embodiment of the invention. The radio buttons 576 allow a user to clone an existing LUN, as per part 436 of the method 100, as well as link to an existing LUN, as per part 438 of the method 100, and create an entirely new LUN, as per part 440 of the method 100. It is noted that the user is further afforded the option of skipping selection of a LUN entirely. By selecting a LUN, the user thus selects a boot logical disk located on SAN storage device 112 for usage by the computing device 114.

Where a previously established association between a LUN and the computing device 114 exists, as has been described in FIG. 5H, then the link to an existing LUN radio button will be selected in FIG. 5I for the user. The user may decide to override this existing association by selecting one of the other radio buttons 576, however. Once the user has selected the desired LUN, and an OS instance to deploy (if applicable), for the computing device 114, he or she selects the next button 578.

Referring back to FIG. 4C, the non-volatile memory, or NVRAM 312, of the computing device 114 is configured based on the selections and configurations previously made by the user (442). This is depicted in FIG. 3 by the line 326. FIG. 5J shows a GUI 580 by which a user initiates the transfer of the settings that have been provided to configure the NVRAM 312 of the computing device 114, according to an embodiment of the invention. The information 582 lists the basic information regarding the computing device 114 in question. The user has the option of overriding the selected switch 118 by altering the value within box 584. Finally, the user selects the yes radio button of the pair of radio buttons 586 to indicate that the settings should be transferred to the NVRAM 312, and finally selects the next button 588.

In one embodiment, the configuration and management controller 302 constructs a settings file based on the SAN storage device 112 selected and configured, the network settings of the device 112 and/or the computing device 114 configured, and the OS instance as selected and deployed onto the SAN storage device 112 (444). This file may be formatted in a markup language, such as the eXtensible markup language (XML), and is inclusive of the parameter values that have to be programmed into the NVRAM 312 of the computing device 114. Thereafter, the controller 302 transmits the settings file to the configuration manager 304 (446).

The configuration manager 304 in turn converts the parameter values into a format understandable by the firmware 322 of the computing device 114, and sends these formatted values to the management module 308 of the chassis 116 for installation on the computing device 114 (448). The management module 308 provides the values to the BMC 310, which writes them to the NVRAM 312 for utilization by the firmware 316. The boot firmware 322 of the firmware 316 utilizes these settings within the NVRAM 312 to construct the BFT 320 within the RAM 318 during boot of the computing device 114.

Thereafter, the computing device 114 can be booted up, such that it utilizes the OS instance deployed on the SAN storage device 112 as its storage. FIG. 5K shows a GUI 590 by which a user can initiate turning on the computing device 114, among other functions, according to an embodiment of the invention. Box 592 lists the blade number, which is the identifier of the computing device 114 within the chassis. The user has the option of selecting one or more of four different options via the checkboxes 594. The user can cause the computing device 114 to be powered off, or to be powered on. The user can also assign a keyboard-video-mouse (KVM) adapter to the computing device 114, as can be appreciated by those of ordinary skill within the art. Finally, the user can assign a media tray to the computing device 114, which couples the devices of the media tray previously described to the computing device 114. The user then selects the next button 596 to execute the operation. This is indicated in FIG. 3 via the line 328.

Advantages and Conclusion

At least some embodiments of the invention provide for advantages over the prior art. In particular, selection and configuration of a computing device, such as a blade computing device, and a storage-area network (SAN) storage device is achieved in a programmatic manner. A user, such as an information technology (IT) personnel, is walked through the configuration process via a graphical user interface (GUI).

Configuration of the computing device and the SAN storage device occurs during this process. As such, it is substantially ensured that the configuration of the computing device and the SAN storage device is achieved properly, without the user having to remember all the different settings and parameters that need to be properly set.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof

I claim:

1. A method comprising:
   displaying a drop-down list of one or more chassis, each chassis having one or more computing devices installed therein;
   selecting a chassis from the drop-down list of one or more chassis;
   after selecting the chassis from the drop-down list of one or more chassis, selecting a computing device from the computing devices installed in the chassis selected, separately from selecting the chassis from the drop-down list of one or more chassis, each computing device connected to one or more switches within the chassis;
   selecting a switch from the switches to which the computing device selected is connected, each switch connected to a storage-area network (SAN) encompassing one or more SAN storage devices;
   selecting a SAN storage device from the SAN storage devices connected to the switch selected;
   configuring network settings for the SAN storage device selected and/or the computing device selected, including configuring dynamic host configuration protocol (DHCP) settings for the computing device;
   configuring the SAN storage device selected for use by the computing device selected; and,
   selecting and deploying an operating system (OS) instance onto the SAN storage device selected for use by the computing device selected,
   wherein configuring the SAN storage device selected for use by the computing device selected comprises:
      determining whether the SAN storage device has been previously configured for use by the computing device;
      in response to determining that the SAN storage device has been previously configured for use by the computing device,
         displaying a volume of the SAN storage device, a logical unit of the volume of the SAN storage device, and a group binding the logical unit to the computing device;
         responsive to displaying the logical unit and the group, permitting a user to specifically and directly delete one or more of the logical unit and the group.

2. The method of claim 1, wherein the list of chassis is created at least partially by programmatically discovering the chassis.

3. The method of claim 1, further comprising configuring security settings for the SAN storage device selected and/or the computing device selected.

4. The method of claim 1, further comprising configuring non-volatile memory of the computing device selected based on the SAN storage device selected and configured, the network settings configured, and the OS instance selected and displayed onto the SAN storage device selected.

5. The method of claim 1, wherein the chassis, the computing device, the switch, and the SAN storage device are selected by a user via a graphical user interface (GUI); the network settings and the SAN storage device are configured by the user via a GUI; and, the OS instance is selected by the user via a GUI.

6. The method of claim 1, wherein selecting the chassis comprises logging onto the chassis.

7. The method of claim 1, wherein selecting the computing device from the computing devices installed in the chassis selected comprises:
   displaying a list of all the computing devices installed in the chassis; and,
   enabling a user to select the computing device from the list, and
   wherein selecting the switch from the switches to which the computing device selected is connected comprises:
      displaying a list of all the switches to which the computing device is connected; and,
      enabling a user to select the switch from the list.

8. The method of claim 1, wherein selecting the SAN storage device from the SAN storage devices connected to the switch selected comprising:
   reading a catalog of all the SAN storage devices connected to the switch selected;
   displaying a list of all the SAN storage devices connected to the switch selected; and,
   enabling a user to select the SAN storage device from the list.

9. The method of claim 1, wherein configuring the network settings for the SAN storage device selected and/or the computing device selected comprises:
   acquiring the media-access control (MAC) address of the computing device to which the DHCP settings for the computing device are to be associated, the DHCP settings including a network address for the computing device selected and a network path of the SAN storage device selected;
   displaying the network address and a host name for the computing device selected, and the network path of the SAN storage device selected; and,
   enabling a user to select whether the network address, the host name, and/or the network path displayed are to be employed.

10. The method of claim 9, wherein the DHCP settings further include a network address of a server at which boot firmware for the computing device selected is stored and from which the computing device selected is to receive the boot firmware during preboot execution, and a filename of the boot firmware as stored at the server,
   wherein configuring the network settings for the SAN storage device selected and/or the computing device selected further comprises:
   automatically selecting that the computing device selected is to receive the boot firmware from the server during preboot execution, where the computing device selected does not have the boot firmware already stored;
   enabling the user to override whether the computing device selected is to receive the boot firmware from the server during preboot execution;
   displaying the filename of the boot firmware to be received by the computing device selected during preboot execution; and, enabling the user to select different boot firmware, by filename, from a list of boot firmware stored at the server.

11. The method of claim 9, wherein the DHCP settings further include one or more vendor-specific options particular to a vendor of the computing device selected,
wherein configuring the network settings for the SAN storage device selected and/or the computing device selected further comprises enabling the user to individually select whether the vendor-specific options are to be employed.

12. The method of claim 1, wherein the computing device is a blade computing device physically situated within the chassis.

13. A system comprising:
a chassis;
one or more computing devices installed within the chassis;
one or more switches installed within the chassis and connected to each computing device;
one or more storage-area network (SAN) storage devices connected to each switch; and,
a configuration and management controller to display a drop-down list of one or more chassis, to enable a user to select the chassis from the drop-down list of one or more chassis, to after selecting the chassis, separately select a desired computing device from the computing devices installed within the chassis, to select a desired switch from the switches installed within the chassis, to select a desired SAN storage device from the SAN storage devices connected to the desired switch, to configure dynamic host configuration protocol (DHCP) settings for the computing device selected, to configure the desired SAN storage device for use by the desired computing device, and to select and deploy an operating system (OS) instance onto the desired SAN storage device for use by the desired computing device,
wherein the controller is to configure the SAN storage device selected for use by the computing device selected by:
determining whether the SAN storage device has been previously configured for use by the computing device;
in response to determining that the SAN storage device has been previously configured for use by the computing device,
displaying a volume of the SAN storage device, a logical unit of the volume of the SAN storage device, and a group binding the logical unit to the computing device;
responsive to displaying the logical unit and the group, permitting the user to specifically and directly delete one or more of the logical unit and the group.

14. The system of claim 13, wherein the controller is to enable the user to configure the DHCP settings for the computing device selected by:
acquiring the media-access control (MAC) address of the computing device to which the DHCP settings for the computing device are to be associated, the DHCP settings including a network address for the computing device selected and a network path of the SAN storage device selected;
displaying the network address and a host name for the computing device selected, and the network path of the SAN storage device selected; and,
enabling the user to select whether the network address, the host name, and/or the network path displayed are to be employed.

15. The system of claim 14, wherein the DHCP settings further include a network address of a server at which boot firmware for the computing device selected is stored and from which the computing device selected is to receive the boot firmware during preboot execution, and a filename of the boot firmware as stored at the server, and
wherein the controller is to enable the user to configure the DHCP settings for the computing device selected by further:
automatically selecting that the computing device selected is to receive the boot firmware from the server during preboot execution, where the computing device selected does not have the boot firmware already stored;
enabling the user to override whether the computing device selected is to receive the boot firmware from the server during preboot execution;
displaying the filename of the boot firmware to be received by the computing device selected during preboot execution; and,
enabling the user to select different boot firmware, by filename, from a list of boot firmware stored at the server.

16. The system of claim 14, wherein the DHCP settings further include one or more vendor-specific options particular to a vendor of the computing device selected, and
wherein the controller is to enable the user to configure the DHCP settings for the computing device selected by further enabling the user to individually select whether the vendor-specific options are to be employed.

17. An article of manufacture comprising:
a non-transitory computer-readable medium; and,
means in the medium for displaying a drop-down list of one or more chassis, for selecting a chassis from the drop-down list of one or more chassis, after selecting the chassis, separately selecting a desired blade computing device installed within the chassis, for selecting a desired switch installed within the chassis, for selecting a desired storage-area network (SAN) storage device connected to the desired switch, for configuring dynamic host configuration protocol (DHCP) settings for the computing device selected, for configuring the desired SAN storage device for use by the desired blade computing device, and for selecting and deploying an operating system (OS) instance onto the desired SAN storage device for use by the desired blade computing device,
wherein the means is to configure the SAN storage device selected for use by the computing device selected by:
determining whether the SAN storage device has been previously configured for use by the computing device;
in response to determining that the SAN storage device has been previously configured for use by the computing device,
displaying a volume of the SAN storage device, a logical unit of the volume of the SAN storage device, and a group binding the logical unit to the computing device;
responsive to displaying the logical unit and the group, permitting a user to specifically and directly delete one or more of the logical unit and the group.

18. The article of manufacture of claim 17, wherein the means is for configuring the DHCP settings for the computing device selected by:

acquiring the media-access control (MAC) address of the computing device to which the DHCP settings for the computing device are to be associated, the DHCP settings including a network address for the computing device selected and a network path of the SAN storage device selected;

displaying the network address and a host name for the computing device selected, and the network path of the SAN storage device selected; and, enabling a user to select whether the network address, the host name, and/or the network path displayed are to be employed.

19. The article of manufacture of claim 18, wherein the DHCP settings further include a network address of a server at which boot firmware for the computing device selected is stored and from which the computing device selected is to receive the boot firmware during preboot execution, a filename of the boot firmware as stored at the server, and one or more vendor-specific options particular to a vendor of the computing device selected, and wherein the means is for configuring the DHCP settings for the computing device selected by further:

automatically selecting that the computing device selected is to receive the boot firmware from the server during preboot execution, where the computing device selected does not have the boot firmware already stored;

enabling the user to override whether the computing device selected is to receive the boot firmware from the server during preboot execution;

displaying the filename of the boot firmware to be received by the computing device selected during preboot execution;

enabling the user to select different boot firmware, by filename, from a list of boot firmware stored at the server; and, enabling the user to individually select whether the vendor-specific options are to be employed.

* * * * *